United States Patent [19]

Blumenstock

[11] Patent Number: 5,476,083
[45] Date of Patent: Dec. 19, 1995

[54] TANK-VENTING APPARATUS AS WELL AS A METHOD AND AN ARRANGEMENT FOR CHECKING THE OPERABILITY OF A TANK-VENTING VALVE

[75] Inventor: Andreas Blumenstock, Ludwigsburg, Germany

[73] Assignee: Robert Bosch GmbH, Stuttgart, Germany

[21] Appl. No.: 230,683

[22] Filed: Apr. 20, 1994

[30] Foreign Application Priority Data

Apr. 20, 1993 [DE] Germany .................. 43 12 721.5

[51] Int. Cl.$^6$ .................. F02M 33/02; F02B 77/08
[52] U.S. Cl. .................. 123/520
[58] Field of Search .................. 123/516, 518, 123/519, 520, 198 D

[56] References Cited

U.S. PATENT DOCUMENTS

| | | | |
|---|---|---|---|
| 4,949,695 | 8/1990 | Vranish et al. | 123/520 |
| 5,158,054 | 10/1992 | Otsuka | 123/520 |
| 5,191,870 | 3/1993 | Cook | 123/520 |
| 5,193,512 | 3/1993 | Steinbrenner et al. | 123/520 |
| 5,195,498 | 3/1993 | Siebler et al. | 123/520 |
| 5,197,442 | 3/1993 | Blumenstock et al. | 123/520 |
| 5,245,973 | 9/1993 | Otsuka et al. | 123/520 |
| 5,261,379 | 11/1993 | Lipinski et al. | 123/520 |
| 5,275,144 | 1/1994 | Gross | 123/520 |
| 5,297,527 | 3/1994 | Suzuki et al. | 123/520 |
| 5,299,545 | 4/1994 | Kuruda et al. | 123/520 |
| 5,333,589 | 8/1994 | Otsuka | 123/520 |
| 5,347,971 | 9/1994 | Kobayashi et al. | 123/520 |
| 5,353,771 | 10/1994 | Blumenstock et al. | 123/520 |

*Primary Examiner*—Thomas M. Moulis
*Attorney, Agent, or Firm*—Walter Ottesen

[57] ABSTRACT

The invention is directed to a method for checking the operability of a tank-venting valve which is connected in a venting line of a tank-venting apparatus between the intake pipe of the internal combustion engine and an adsorption filter equipped with a venting line. The tank-venting valve can be driven into two switching states, namely, an open state and a closed state. The method includes the steps of: driving the tank-venting valve to reach one of the two selectable switching states; checking the pressure on the end of the tank-venting valve facing away from the intake pipe and checking whether this pressure exhibits a time-dependent trace as it cannot occur in the desired switching state; and, concluding that a defect in the tank-venting valve is present when the condition checked in the previous step is satisfied. With this method, the operability of a simple tank-venting valve can be reliably checked. The method requires no special mechanical, capacitive or inductive checking arrangement.

4 Claims, 4 Drawing Sheets

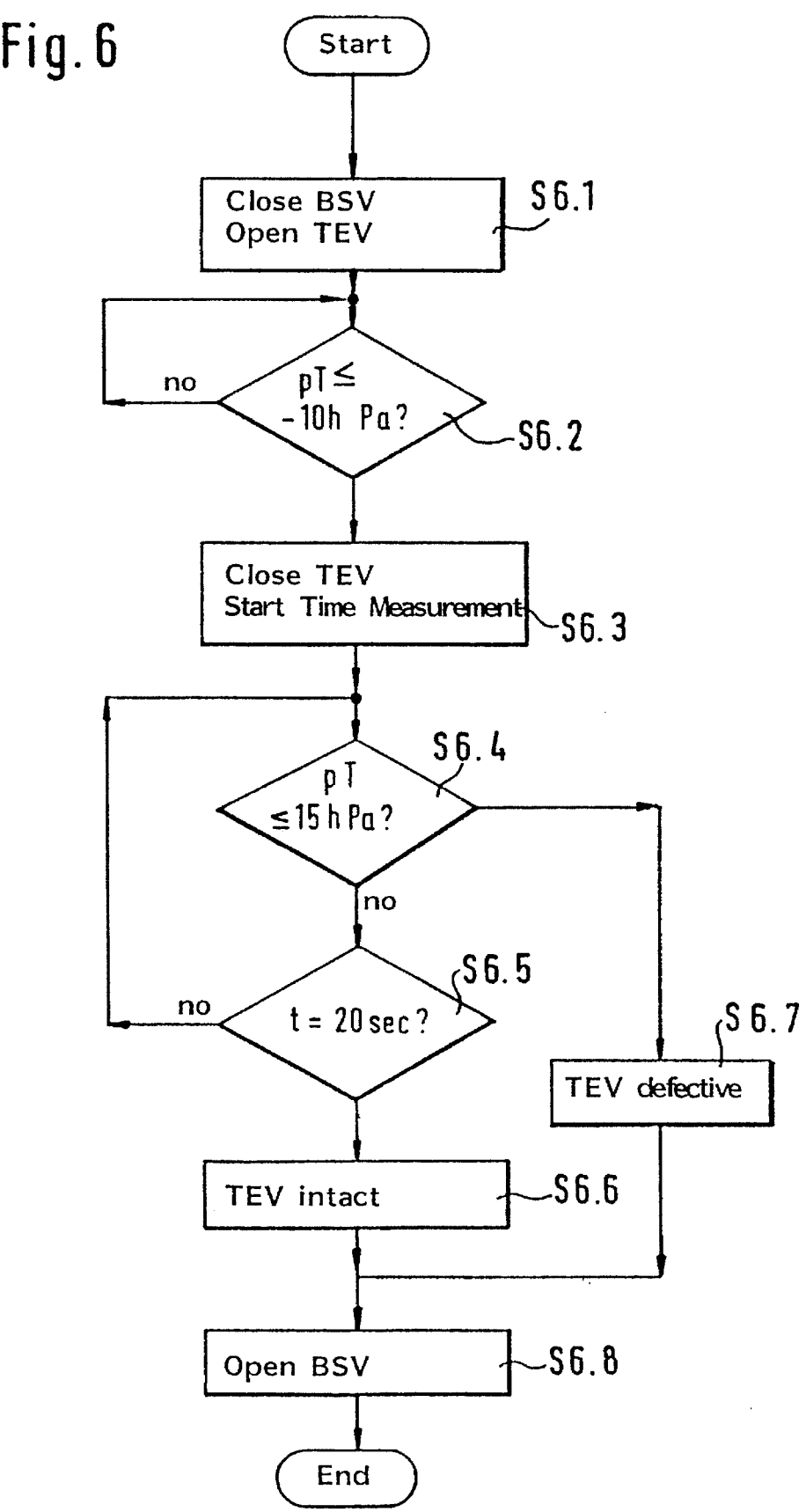

TANK-VENTING APPARATUS AS WELL AS A METHOD AND AN ARRANGEMENT FOR CHECKING THE OPERABILITY OF A TANK-VENTING VALVE

FIELD OF THE INVENTION

The invention relates to a tank-venting apparatus for a motor vehicle equipped with an internal combustion engine as well as a method and an arrangement for checking the operability of a tank-venting valve of the tank-venting apparatus.

BACKGROUND OF THE INVENTION

Tank,venting valves are usually driven at a particular pregiven pulse-duty factor. In the following, two switching states are referred to, namely, an open state and a closed state, which is to be understood as will now be explained. The closed state means that state wherein the valve is continuously closed. For tank-venting valves, this is, as a rule, the rest state. The open state is that state wherein the valve is driven by an opening signal at a pregiven pulse-duty factor such as at 10%, 50% or 90%. The term "open state" is therefore a generic term for many specific opening states at respective specific pulse-duty factors of the opening signal.

Tank-venting apparatus typically include the following components: a tank; an adsorption filter which is connected to the tank via a tank-venting line; and, a tank-venting valve which is connected into a connecting line which connects the adsorption filter to the intake pipe of an internal combustion engine.

The operability check of the tank-venting valve in its conventional configuration is based upon the fact that the tank-venting valve can be driven electrically. Values can be measured which are expected for the control current in dependence upon the control voltage. When these values are measured, the assumption can be made that the valve operates properly; otherwise, a fault is assumed.

It is common to check the operability of valves by monitoring the stroke of the actuating member of the valves. This can be performed mechanically, capacitively or inductively. An inductive check with the aid of a magnetic field as it is generated by a coil attached to an actuating member is especially effective. However, the configuration of such valves is very complex if the check of the operability is to be reliable, and the cost of such valves compared to those which cannot be checked as to operability is greatly increased.

SUMMARY OF THE INVENTION

It is an object of the invention to provide a method and an arrangement for checking the operability of a tank-venting valve without it being necessary to provide a complex configuration of the valve.

The method of the invention is for checking the operability of a tank-venting valve of a tank-venting apparatus of an internal combustion engine having an intake pipe. The tank-venting apparatus has an adsorption filter and a connecting line between the intake pipe and the adsorption filter with the tank-venting valve being mounted in the connecting line. The adsorption filter has a venting line and the tank-venting valve has an end facing away from the intake pipe and is driveable between a first switching state wherein the valve is open and a second switching state wherein the valve is closed. The method includes the steps of: (a) driving the tank-venting valve to reach one of the switching states; (b) checking the pressure in the tank-venting apparatus at the end of the tank-venting valve facing away from the intake pipe to determine whether this pressure exhibits a time-dependent trace which the pressure cannot have in the one switching state; and, (c) drawing a conclusion that the tank-venting valve is defective when the condition checked in step (b) is satisfied.

A variation of the method of the invention requires a new configuration of the tank-venting apparatus. Accordingly, it is another object of the invention to provide a tank-venting apparatus which is so configured that its operability can be reliably checked.

The invention is based upon the recognition that the operability of the tank-venting valve can be determined by monitoring the pressure relationships in the tank-venting apparatus. For example, relatively intense pressure pulsations of typically ±50 hPa can be present in the intake pipe of an internal combustion engine irrespective of whether the engine is equipped with a charger. These pressure pulsations can even be significantly greater. If the tank-venting valve closes properly, pulsations of this kind cannot be detected at the end portion of the valve line facing toward the filter. In contrast, as soon as the valve exhibits leakage to the extent that the proper operation of the tank-venting apparatus is disturbed, the pulsations can be clearly detected at the end portion of the valve line next to the filter which thereby indicates a faulty non-closing tank-venting valve. These pressure pulses are transmitted from the intake pipe through the tank-venting valve which is slightly open.

Numerous tank-venting apparatus known from the patent literature include a shutoff valve in the venting line of the adsorption filter to check the operability of the overall apparatus. As soon as this valve is closed, it is possible to place the apparatus under pressure which can be an underpressure or an overpressure. In each case, the pressure can be generated by opening the tank-venting valve. For an engine without charger, the underpressure in the tank can be built up; whereas, for an engine equipped with a charger and in charging operation, an overpressure is generated. As soon as the tank-venting valve is driven to close the same, the pressure may no longer change in the direction it had up until now. If the pressure nonetheless changes in this direction, then the tank-venting valve does not close properly.

The tank-venting apparatus according to the invention includes a pressure sensor in the part of the valve line near the filter. In this way, the above-mentioned pressure pulsations can be determined when the tank-venting valve is open. If the tank-venting valve is driven so as to open and no pressure pulsations occur, then the valve does not open in a faulty manner; whereas, if pressure pulsations do occur, even though the valve is driven so as to close, this shows that it is defective and does not close. The pressure sensor is preferably a difference pressure sensor. The sensor can be so configured that it responds only to a specific difference pressure which is so selected that it is exceeded by pressure pulsations as they occur when the tank-venting valve is opened.

As explained above, the invention can be realized with the aid of overpressure as well as with the aid of underpressure in the tank-venting apparatus. Accordingly, only "pressure" or "difference pressure" will be referred to in the following without characterizing as to whether the overpressure region or underpressure region is being discussed. When it is stated that "a pressure exceeds a threshold" then this refers to absolute values. Accordingly, a specific threshold pressure is exceeded for overpressure; whereas, in the case of underpressure, the measured underpressure, seen absolutely, drops below a threshold; however, seen as an amount, the threshold is exceeded.

BRIEF DESCRIPTION OF THE DRAWINGS

The invention will now be described with reference to the drawings wherein:

FIG. 2b is a time-dependent trace of the pressure at the pressure sensor in the apparatus of FIG. 1 when the tank-venting valve is operational and FIG. 2c shows the pressure for the condition wherein the tank-venting valve is non-operational;

FIGS. 5a and 5b show time-correlated diagrams wherein FIG. 5a shows the open and closed states of the tank-venting valve as a function of time;

FIG. 5b is a time-dependent trace of the pressure measured at the pressure sensor of the apparatus of FIG. 4; and, FIG. 6 is a flowchart of a method for checking the operability of the tank-venting valve in the apparatus of FIG. 4.

DESCRIPTION OF THE PREFERRED EMBODIMENTS OF THE INVENTION

Figure 1:
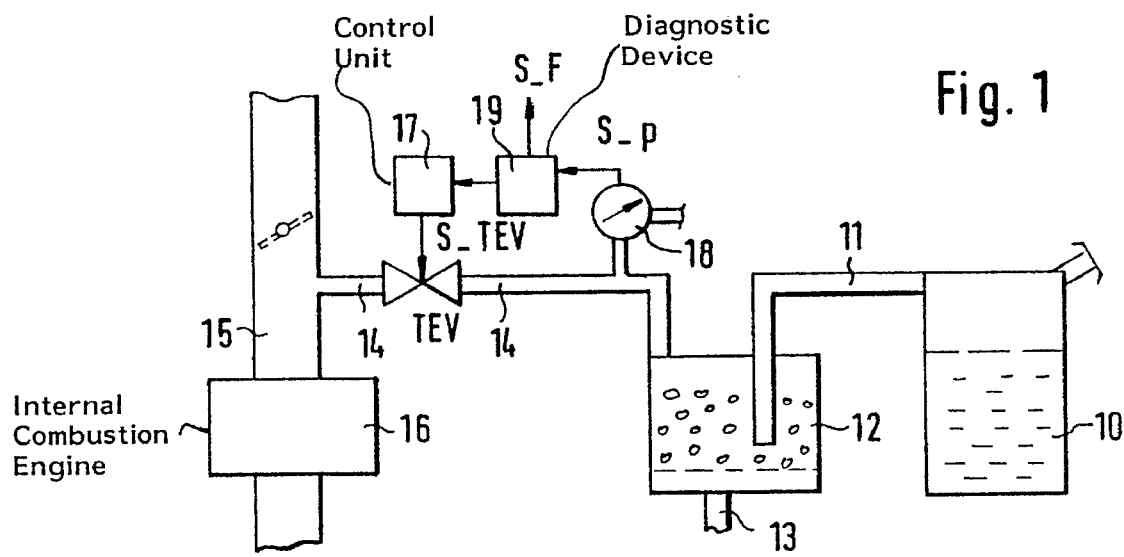
FIG. 1 is a schematic of a tank-venting apparatus connected to the intake pipe of an internal combustion engine with a pressure sensor in the portion of the connecting line of the tank-venting valve near the filter. The tank-venting apparatus also includes an arrangement for checking the operability of this valve.

The tank-venting apparatus shown in FIG. 1 includes a tank 10 which is connected via a supply line 11 to an adsorption filter 12 having a venting line 13 connected thereto. The adsorption filter 12 is connected via a connecting line 14 to the intake pipe 15 of an internal combustion engine 16. A tank-venting valve TEV is mounted in the venting line 14 and is driven via a control signal S_TEV by a control apparatus 17. A difference pressure sensor lid is mounted on the end portion of connecting line 14 near the adsorption filter. The difference pressure sensor 18 supplies a signal S_p which indicates the difference pressure (p) in the portion of the connecting line 14 connected to the filter. This signal is supplied to a diagnostic device 19 which is also supplied with the control signal S_TEV for the tank-venting valve. The diagnostic device 19 supplies a signal S_F which indicates whether the tank-venting valve is operational or not.

Figure 2A:
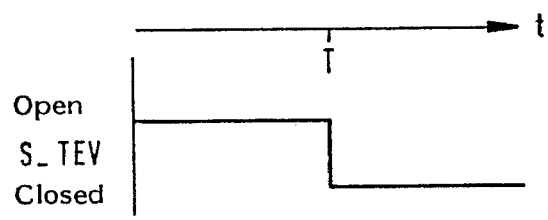
FIGS. 2a to 2c show respective time-correlated signal traces concerning the tank-venting valve with FIG. 2a showing the time duration that the valve is open and closed.

The tank-venting valve TEV is driven by a signal S TEV to check the operability thereof. The signal S_TEV is shown in FIG. 2a. The tank-venting valve is driven so as to open up to a time point T; thereafter, the tank-venting valve is driven so as to be closed. It is noted that tank-venting valves in the open state are never driven by a constant signal; instead, the tank-venting valve is always driven at a specific pulse-duty factor. The state "open" up to time point T in FIG. 2 shows that the tank-venting valve is driven, for example, at a pulse-duty factor of 10%.

Figure 2B:
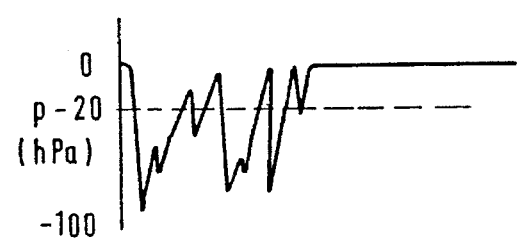

FIG. 2b shows the difference pressure measured by the difference pressure sensor 18. Here, we are concerned with an underpressure since no charger is connected upstream of the intake pipe 15 in the arrangement shown in FIG. 1. For this reason, an underpressure is present in the intake pipe. At full load, this underpressure is only very slight and it also hardly exhibits pressure pulsations. At low load, the underpressure can, for example, amount to 300 hPa with intense pressure pulsations.

In FIG. 2b, a case is shown wherein underpressure peaks of the difference pressure (p) of up to 100 hPa occur while the tank-venting valve TEV is driven open. After the time point T, no pressure pulsations of any kind are, however, noticeable in the portion of the connecting line 14 next to the filter. Proper closure of the tank-venting valve can therefore be determined in that the pressures (p) measured by the difference pressure sensor 18 are compared to a threshold value which is shown in FIG. 2b as a value of −20 hBa. If this threshold value is not exceeded after the time point T viewed absolutely, then this shows that the tank-venting valve TEV has closed properly. Fault announcements concerning the operability can be caused by disturbance signals. To avoid this, it is advantageous that the output signal S_p of the pressure sensor 18 is filtered slightly by means of a low-pass filter. A signal is then generated in advance of time point T which no longer exhibits the high pressure peaks as shown in FIG. 2b; instead, a signal is generated which exhibits only lower pressure values which always still exceed in magnitude the determined threshold value.

Figure 2C:
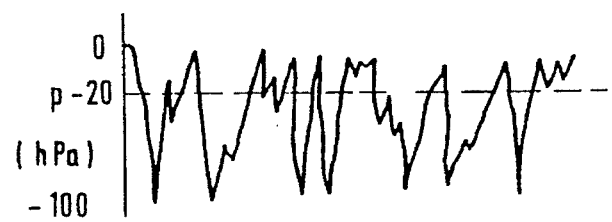

In contrast, FIG. 2c shows the trace of the pressure (p) in the case of a continuously open tank-venting valve, that is, notwithstanding the closing drive (in practice, this is, as a rule, a state in which no current flows), the tank-venting valve does not close after the time point T. Here, pressure pulsations occur after time point T as in advance of this time point.

If a charger is mounted upstream of the intake pipe 15, then the traces shown in FIGS. 2a to 2c apply correspondingly for the difference overpressures instead of for difference underpressures. This, however, is only for the operating states wherein the charger is driven. High overpressures and high pressure pulsations occur especially in the higher load range. In order to obtain a reliable statement as to the operability of the tank-venting valve TEV with the aid of the threshold inquiry explained with respect to FIGS. 2a to 2c, it is then advantageous in such a case to undertake the check in the upper load range of the internal combustion engine 16. In contrast to the foregoing, it is advantageous to perform the check in the lower load range for an engine without a charger because here, as explained above, the underpressure and the pressure pulsations are especially high.

A method fit for checking the operability of the tank-venting valve TEV in the apparatus of FIG. 1 will now be explained with respect to the flowchart of FIG. 3. The method is based on the realizations explained with respect to FIGS. 2a to 2c.

This method is started as soon as a suitable operating state for the check is present as explained above. This suitable operating state must remain for the duration of the test. In step s3.1, the tank-venting valve TEV is closed and the time measurement starts with the closure time point. In step s3.2, an inquiry is made as to whether the pressure (p) measured by the difference pressure sensor 18 has exceeded in magnitude a threshold value. For the case shown in FIG. 2b, this corresponds to the inquiry as to whether the pressure (p) is less than −20 hPa. If this is not the case, then an inquiry is made in step s3.3 as to whether a test time span (t) of 5 seconds has elapsed. If this is not the case, the program returns to step s3.2. In contrast, if the test time span has run in step s3.3, then a statement is provided in step s3.4 that the tank-venting valve is intact.

In contrast, if the program leaves the loop of steps s3.2 and s3.3 before the test time span has run so that the result is obtained in step s3.2 that the threshold value is exceeded in magnitude, then the statement is provided in step s3.5 that the tank-venting valve TEV is defective. This then indicates a serious defect concerning the development of toxic gas. For this reason, it is recommended to display this fault to a driver by illuminating a warning lamp. The end of the method is reached after running through one of the steps s3.4 or s3.5.

Figure 3:
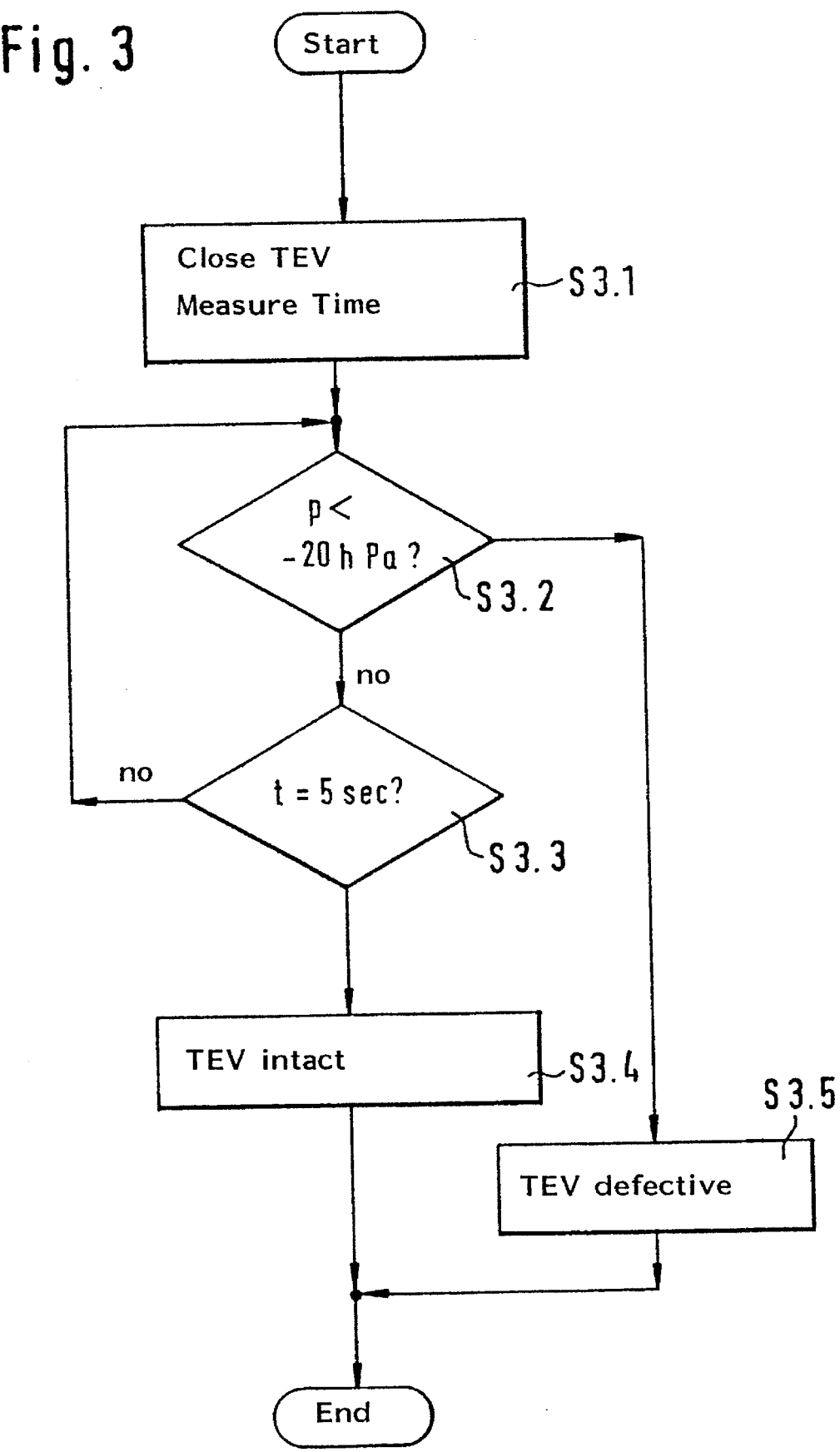
FIG. 3 is a flowchart of a method for checking the operability of the tank-venting valve in the apparatus of FIG. 1.

The sequence described in FIG. 3 is carried out in the diagnostic device 19. In order to determine suitable conditions for the start of the method the diagnostic device receives data as to the operating state of the engine 16 and especially as to the rpm and the load which is, however, not shown in FIG. 1. The diagnostic device emits a signal to the control unit 17 that the diagnostic device in,step s3.1 supplies a signal to close the tank-venting valve TEV. As explained above, the diagnostic device 19 receives the pressure difference signal S__p from the underpressure sensor 18. The time span mentioned in the method of FIG. 3 is measured with the aid of a clock signal which is generated internally or supplied externally.

Figure 4:
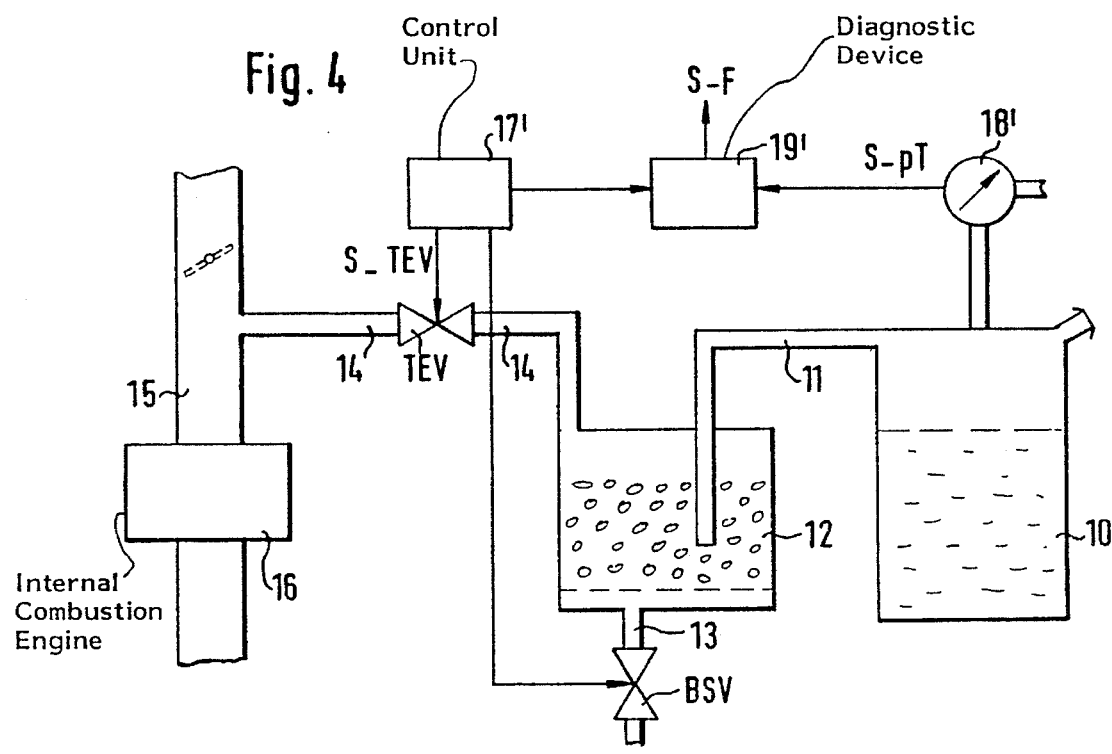
FIG. 4 is a schematic similar to that of FIG. 1 but with a pressure sensor on the tank in lieu of on the tank-venting valve with the apparatus further including a shutoff valve in the venting line of the adsorption filter.

A second primary embodiment of the invention is explained with respect to FIGS. 4 to 6. In this embodiment, a monitoring of the pressure pulsations in the end of the connecting line connected to the filter does not take place; instead, a check is made as to whether a pressure (underpressure or overpressure), which has built up in the tank because of opening the tank-venting valve TEV, still changes when the tank-venting valve actually should again be closed.

The tank-venting apparatus of FIG. 4 corresponds with very few exceptions to the apparatus shown in FIG. 1. The first exception is that the difference pressure sensor is attached to the tank 10. The sensor is identified in FIG. 4 by reference numeral 18'. This difference pressure sensor 18' is intended to measure with greater precision than the difference pressure sensor 18 in the connecting line 14 in the assembly of FIG. 1. This is so because no pressure pulsations having a high amplitude occur in the tank; instead, ambient pressure is present virtually continuously as long as the venting line 13 is open. The venting line 13 can, however, be closed by a venting check valve BSV which is a second difference compared to the configuration of FIG. 1. The venting check valve BSV can be driven by a control unit in the same manner as the tank-venting valve TEV. The control unit here is identified by reference numeral 17'. pressure builds up in the tank 10 when the venting check valve BSV is closed and the tank-venting valve TEV is open. The pressure generated in the tank is limited to a value of, for example, 10 hPa seen absolutely in order not to load the tank to too great an extent and in Order not to facilitate too greatly the vaporization of the fuel in the tank 10 in the case of underpressure. A signal S__pT is supplied to a diagnostic device 19'. The signal S__pT indicates the difference pressure present in the tank.

Figure 5A:
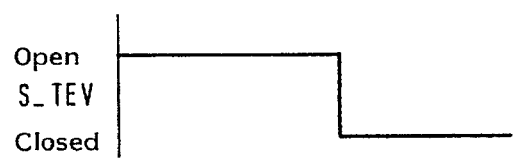
Figure 5B:
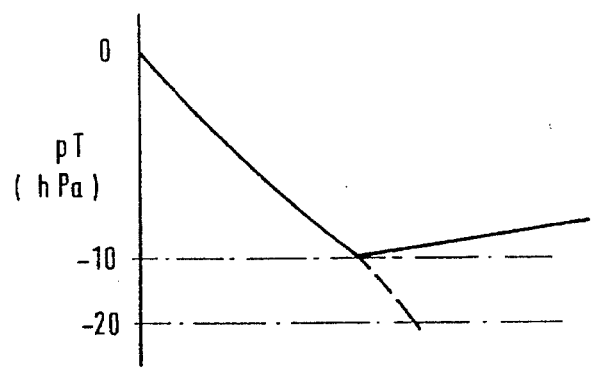

The principle according to which the tank-venting apparatus assembled in this manner checks the operability of the tank-venting valve TEV is explained with respect to FIG. 5. Here, FIG. 5a corresponds completely to FIG. 2a and, for this reason, reference is made to the description provided with respect to FIG. 2a. FIG. 5b shows the trace of the difference pressure pT in the tank 10. Here, it is assumed that underpressure is present in,the intake pipe 15 and underpressure is built up when the tank-venting valve TEV is opened while the venting check valve BSV is closed. As soon as the difference underpressure (difference with respect to ambient pressure) reaches a first threshold value of −10 hPa, the tank-venting valve is driven to close. This corresponds to the time point T. Since now the entire portion of the apparatus on the side of the filter is closed, the pressure in the tank should ideally remain constant. However, the pressure slowly decays because of vaporizing fuel and because of small leaks. This is shown in FIG. 5b by a line which climbs slightly after the time point T.

If the tank-venting valve TEV is, however, defective, it does not close even though it is driven to close at time point T, that is, when the first threshold value of −10 hPa is exceeded. The pressure then drops steadily and finally exceeds, in magnitude, a second threshold value of −20 hPa. This pressure trace is shown by a broken line in FIG. 5b. The venting check valve BSV is opened as soon as the second threshold value is exceeded in order to avoid destroying the tank because of an unintended intense build-up of underpressure.

FIGS. 2a to 2c are here referred to with respect to a check with underpressure or overpressure and with respect to suitable operating states of the engine 16 for a test.

A method for checking the operability of the tank-venting valve TEV in the apparatus of FIG. 4 is described with respect to the flowchart of FIG. 6. The flowchart of FIG. 6 is based on the realization explained with respect to FIG. 5. This method is started as soon as suitable test conditions are obtained as explained with respect to FIGS. 2a to 2c and FIG. 3.

In step s6.1, the venting check valve BSV is driven so as to close and the tank-venting valve TEV is driven so as to open. In step s6.2, a check is made as to whether the tank difference pressure pT exceeds the above-mentioned threshold value of 10 hPa. This is checked in that an inquiry is made as to whether this pressure pT is less or equal to −10 hPa. A step s6.3 is reached as soon as this is the case. In order to prevent that step s6.2 is run through continuously in the event that the tank-venting valve does not open properly or the venting check valve BSV does not close properly, a time inquiry can take place in step s6.2 which provides that the program leaves step s6.2 with a fault announcement when there is no drop below the first threshold value within, for example, one minute.

Step s6.3 already mentioned, as well as the following steps s6.4 to s6.7, correspond almost identically to steps s3.1 to s3.5. For this reason, reference is made to the description provided above with respect to steps s3.1 to s3.5. The only differences are seen in that: the tank pressure pT is interrogated in lieu of the pressure (p) in connecting line 14; the threshold in step s6.4 has the value −15 hPa in lieu of the value −20 hPa in step s3.2; and, the time span interrogated in step s6.5 has a duration of 20 seconds in lieu of the duration of 5 seconds in step s3.3. ended.

As explained with respect to FIGS. 1 to 3, it is possible with the tank-venting apparatus of FIG. 1 to not only diagnose faults when closing the tank-venting valve TEV, but also faults when opening the tank-venting valve TEV. In contrast, a reliable statement can be made only with respect to improper closure of the tank-venting valve with the tank-venting apparatus of FIG. 4. If the tank-venting valve is driven so as to open and if nonetheless no pressure builds up, this does not perforce mean that the tank-venting valve does not open properly. It is possible that the tank-venting valve opens properly but that the pressure in the tank 10 nonetheless does not change because, for example, one of the lines between the tank-venting valve and the tank is closed or because a leak is present or because the venting check valve BSV does not close properly.

It was noted with respect to the flowcharts of FIGS. 3 and 6 that the methods according to these flowcharts can then only be started when suitable test conditions are present. For this purpose, specific load states of the engine 16 were referred to. The ideal test condition is, however, an inquiry directly of the intake pipe pressure. Such a procedure is, however, only purposeful when an engine is provided with an intake pipe pressure sensor. In practice, only few engines are provided with sensors of this kind. Accordingly, ancillary variables are therefore investigated which indicate the intake pipe pressure directly or indirectly. As already mentioned, the engine rpm and the load of the engine are suitable for this purpose. This load can, for example, be expressed by the opening angle of the throttle flap on the engine for by the signal of an air-flow sensor.

In the embodiments described above, the difference pressure sensor 18 is disposed between the tank-venting valve TEV and the adsorption filter 12. However, when the adsorption filter is connected to the line between the tank 10 and the tank-venting valve by means of a T-piece, pressure fluctuations propagate themselves on the end of the tank-venting valve facing away from the intake pipe through the above-mentioned line up to close to the opening of the line into the tank so that the difference pressure sensor can be mounted anywhere on this line.

It is understood that the foregoing description is that of the preferred embodiments of the invention and that various changes and modifications may be made thereto without departing from the spirit and scope of the invention as defined in the appended claims.

What is claimed is:

1. A method for checking the operability of a controllable tank-venting valve of a tank-venting apparatus of an internal combustion engine having an intake pipe, the tank-venting apparatus including: a tank having a tank pressure sensor for measuring pressure in said tank and an adsorption filter, the absorption filter communicating with said tank, said tank-venting valve (TEV) and the ambient via a venting check valve (BSV), said tank-venting valve (TEV) being connected to pass vapors from said tank-venting apparatus to said intake pipe, the method comprising the steps of:

(a) closing said venting check valve;

(b) driving said tanks venting valve (TEV) to open;

(c) monitoring said tank pressure sensor to determine a reaction thereof;

(d) driving said tank,venting valve (TEV) to close;

(e) monitoring said tank pressure sensor to determine a reaction thereof; and, (f) emitting a fault signal to indicate that said tank-venting valve (TEV) is defective when said pressure in said tank changes in the same direction before and after performing step (d).

2. A method for checking the operability of a controllable tank-venting valve of a tank-venting apparatus of an internal combustion engine having an intake pipe, the tank-venting apparatus including: a tank having a tank pressure sensor for measuring pressure in said tank and an adsorption filter, the absorption filter communicating with said tank, said tank-venting valve (TEV) and the ambient via a venting check valve (BSV), said tank-venting valve (TEV) being connected to pass vapors from said tank-venting apparatus to said intake pipe, the method comprising the steps of:

driving the venting check valve (BSV) so as to close and driving said tank-venting valve (TEV) so as to open;

checking as to whether a tank difference pressure (pT) is equal to or less than a predetermined first threshold value;

if this is the case, then closing said tank-venting valve (TEV) and measuring time from the time point at which said tank-venting valve (TEV) is closed;

determining whether the pressure (pT) measured by said tank pressure sensor has exceeded a predetermined second threshold value;

if this is not the case, then determining whether a predetermined test time span (t) has elapsed;

if this is not the case, then again making an inquiry as to whether the pressure (pT) measured by said tank pressure sensor has exceeded said second threshold value and;

if the test time span (t) has run said predetermined test time span (t), then providing a statement that said tank-venting valve is intact.

3. The method of claim 2, comprising the further step of: if said second threshold value is exceeded in magnitude, then emitting a statement that said tank-venting valve (TEV) is defective.

4. An arrangement for checking the operability of a controllable tank-venting valve of a tank-venting apparatus of an internal combustion engine having an intake pipe, the tank-venting apparatus including: a tank having a tank pressure sensor for measuring pressure in said tank and an adsorption filter, the absorption filter communicating with said tank, said tank-venting valve (TEV) and the ambient via a venting check valve (BSV), said tank-venting valve (TEV) being connected to pass vapors from said tank-venting apparatus to said intake pipe, the arrangement comprising:

means for closing said venting check valve;

means for driving said tank-venting valve (TEV) to open;

means for monitoring said tank pressure sensor to determine a reaction thereof;

means for driving said tank-venting valve (TEV) to close;

means for again monitoring said tank pressure sensor to determine a reaction thereof; and, means for emitting a fault signal to indicate that said tank-venting valve (TEV) is defective when said pressure in said tank changes in the same direction before and after opening and closing said tank-venting valve.

* * * * *

UNITED STATES PATENT AND TRADEMARK OFFICE
CERTIFICATE OF CORRECTION

PATENT NO. : 5,476,083

DATED : December 19, 1995

INVENTOR(S) : Andreas Blumenstock

It is certified that error appears in the above-identified patent and that said Letters Patent is hereby corrected as shown below:

In column 1, line 16: delete "Tank,venting" and substitute -- Tank-venting -- therefor.

In column 2, line 67: delete "threshold"" and substitute -- threshold", -- therefor.

In column 3, line 52: delete "lid" and substitute -- 18 -- therefor.

In column 3, line 62: delete "S TEV" and substitute -- S_TEV -- therefor.

In column 4, line 22: delete "hBa." and substitute -- hPa. -- therefor.

In column 5, line 4: delete "net" and substitute -- not -- therefor.

In column 5, line 25: delete "in,step" and substitute -- in step -- therefor.

In column 5, line 58: before "pressure", insert -- A --.

In column 5, line 62: delete "Order" and substitute -- order -- therefor.

UNITED STATES PATENT AND TRADEMARK OFFICE
CERTIFICATE OF CORRECTION

PATENT NO. : 5,476,083

DATED : December 19, 1995

INVENTOR(S) : Andreas Blumenstock

It is certified that error appears in the above-identified patent and that said Letters Patent is hereby corrected as shown below:

In column 6, line 63: delete "ended."

In column 6, between lines 63 and 64: insert the following paragraph -- Intact and detective tank-venting valves are indicated in steps s6.6 and step 6.7, respectively. After running through either step s6.6 or step 6.7, a step s6.8 is reached wherein the tank-venting valve BSV is opened. Thereafter, the method is ended. --.

In column 7, line 10: delete "closed" and substitute -- clogged -- therefor.

In column 7, line 20: delete "Accordingly" and substitute -- Accordingly -- therefor.

In column 7, line 25: delete "for" and substitute -- or -- therefor.

In column 7, line 55: delete "tanks venting" and substitute -- tank-venting -- therefor.

In column 7, line 58: delete "tank,venting" and substitute -- tank-venting -- therefor.

In column 8, line 29: delete "value" and substitute -- value; -- therefor.

UNITED STATES PATENT AND TRADEMARK OFFICE
CERTIFICATE OF CORRECTION

PATENT NO. : 5,476,083

DATED : December 19, 1995

INVENTOR(S) : Andreas Blumenstock

It is certified that error appears in the above-identified patent and that said Letters Patent is hereby corrected as shown below:

In column 8, line 30: delete "and;" and substitute -- and, -- therefor.

Signed and Sealed this

Tenth Day of September, 1996

Attest:

BRUCE LEHMAN

Attesting Officer     Commissioner of Patents and Trademarks